UNITED STATES PATENT OFFICE.

HENRY FAKE, OF CHICAGO, ILLINOIS.

IMPROVEMENT IN DISTILLING ALCOHOLIC SPIRITS.

Specification forming part of Letters Patent No. 133,523, dated December 3, 1872.

*To all whom it may concern:*

Be it known that I, HENRY FAKE, of Chicago, in the county of Cook and State of Illinois, have invented a new and useful Improvement in Distilling Alcoholic Spirits, of which the following is a specification:

The present invention has for its object the obtaining of an increased yield of alcohol or spirits, and also of pure spirits, from one distillation.

To accomplish this I put into the mash made from one hundred bushels, half pound of permanganate of potash and forty pounds of ground charcoal, charcoal made from sugar-maple being considered the best; or the potash and charcoal may be mixed in the meal or put into the beer at any time before distillation takes place.

I am aware that charcoal has been used in meal, mash, and beer before distillation, as in my patent of July 6, 1870, No. 105,788, and that permanganate of potash was used by Luther Atwood in his process patented August 23, 1853, for purifying alcohol. But charcoal will not neutralize fusel-oil in any process of distillation; it only absorbs a portion of it. Consequently spirits put through charcoal as the only means of purifying it is not suitable for preparing the more delicate extracts—in short, it contains considerable poison.

I am also aware that permanganate of potash has been used in alcohol after distillation, after which the alcohol has been re-distilled to remove the residuum; but distillation alone will not wholly carry off the product of the union of potash and fusel-oil, as a chemical examination shows.

The effect of the charcoal and potash combined in the mash is as follows: First, the potash keeps the mash sweet, so that there is a larger yield of alcohol. This is from the fact that a mash becomes slightly sour many times before the result becomes known. The slightest acid reduces the quantity of alcohol. Experiments have proven that over a pint of alcohol more has been produced from the same still per bushel of grain by my process and compound than by the ordinary process. Second, the potash forms a chemical union with the fusel-oil, and consequently changes its original condition. The charcoal is found to absorb the residuum or product of such union, and during the process of distillation and running through the alcohol column is taken out, leaving the alcohol more nearly pure than by any other process of distilling now in use. A chemical analysis has proven this, as the residuum is found in the slops, but in such neutralized state and in such small quantity as to produce no injury to stock when fed to them.

A greater or less quantity of charcoal and potash may be used, but the amount given is found to answer the purpose well, not leaving any potash in the alcohol. But to increase the amount of alcohol the compound should be put in the meal or mash, although a small increase may be attained by putting it in the beer.

Having thus described my invention, what I claim, and desire to secure by Letters Patent, is—

The combination of the permanganate of potash and charcoal when put into the meal, mash, or beer before distillation for increasing the product of alcohol and attaining a pure article of spirits, as set forth.

HENRY FAKE.

Witnesses:
G. L. CHAPIN,
JAMES STREET.